United States Patent [19]
Young

[11] Patent Number: 5,277,886
[45] Date of Patent: * Jan. 11, 1994

[54] METHOD FOR REDUCING THE RISK IN TRANSPORTING AND STORING LIQUID AMMONIA

[75] Inventor: Donald C. Young, Fullerton, Calif.

[73] Assignee: Union Oil Company of California, Los Angeles, Calif.

[*] Notice: The portion of the term of this patent subsequent to Jun. 1, 2010 has been disclaimed.

[21] Appl. No.: 861,198

[22] Filed: Mar. 31, 1992

Related U.S. Application Data

[63] Continuation-in-part of Ser. No. 545,855, Jun. 29, 1990, Pat. No. 5,215,674.

[51] Int. Cl.$^5$ .......................... C01C 1/00; C01C 3/00; C01B 21/00
[52] U.S. Cl. .................... 423/265; 423/235; 423/237; 423/238; 423/268; 423/352
[58] Field of Search ............... 423/265, 268, 352, 235, 423/237, 238

[56] References Cited

U.S. PATENT DOCUMENTS

| | | | |
|---|---|---|---|
| Re. 19,537 | 1/1935 | Pierce | 220/9 |
| 3,538,867 | 11/1970 | Every et al. | 111/6 |
| 3,557,007 | 1/1971 | Cox | 423/265 |
| 3,716,350 | 2/1973 | Hashimoto | 71/28 |
| 3,984,227 | 1/1976 | McConnell et al. | 71/65 |
| 4,078,394 | 1/1978 | Chamberlain et al. | 62/263 |
| 4,508,558 | 4/1985 | Young | 71/30 |
| 4,699,633 | 10/1987 | Young | 55/5 |
| 5,215,674 | 6/1993 | Young | 423/235 F |

FOREIGN PATENT DOCUMENTS 697772 11/1964 Canada .
1103311 10/1959 Fed. Rep. of Germany ...... 423/265

OTHER PUBLICATIONS

The Condensed Chemical Dictionary p. 1194.
"Fertilizers", *Kirk-Othmer Encyclopedia of Chemical Technology*, Third Edition, John Wiley & Sons, vol. 10, pp. 54-55.

*Primary Examiner*—Gregory A. Heller
*Attorney, Agent, or Firm*—Gregory F. Wirzbicki; Shlomo R. Frieman

[57] ABSTRACT

The addition of a nucleating or coalescing agent (e.g., urea) to liquid ammonia reduces the size and persistence of a deadly, fog-like cloud of ammonia droplets that tend to form when liquid ammonia is accidentally released to the atmosphere. In addition, high purity ammonia is obtained by evaporating ammonia from the ammonia- and nucleating agent-containing composition.

20 Claims, 1 Drawing Sheet

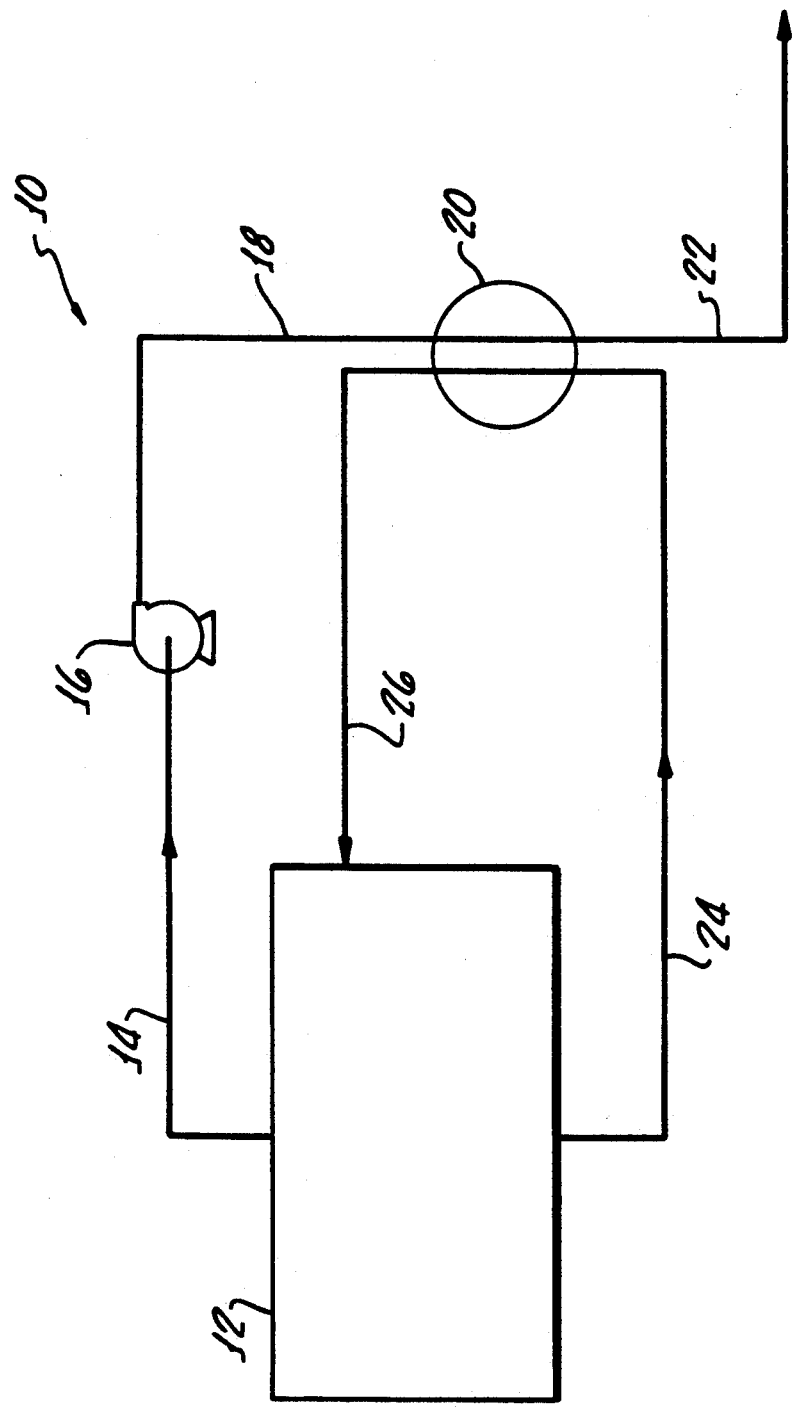

5,277,886

METHOD FOR REDUCING THE RISK IN TRANSPORTING AND STORING LIQUID AMMONIA

CROSS-REFERENCE TO RELATED APPLICATION

This application is a continuation-in-part of application Ser. No. 07/545,855, filed Jun. 29, 1990, which application is incorporated herein in its entirety by reference now U.S. Pat. No. 5,215,674.

BACKGROUND

This invention relates to transporting and storing liquid ammonia and, more specifically, to limiting the risk of harm in the event of an accidental liquid ammonia spill. (As used in the specification and claims, the term "liquid ammonia" means any grade of ammonia existing in the liquid state that boils at or below ambient temperature and pressure, i.e., about 101.3 kpascal (about 1 atm) and about 20° C. (about 68° F.)).

Anhydrous liquid ammonia is used in massive quantities world-wide for many industrial and agricultural purposes. (As used in the specification and claims, the term "anhydrous liquid ammonia" means liquid ammonia that is at least about 98 weight percent ammonia and up to about 2 weight percent water. Under one commercial standard, anhydrous liquid ammonia transported by pipeline must be at least 99.5 weight percent ammonia. Anhydrous liquid ammonia is thus substantially water-free, but nevertheless often contains a small proportion of water, e.g., about 0.1 to about 0.5 weight percent, purposely included to inhibit corrosion of storage vessels and pipes.) A gas at ambient temperatures and pressures, anhydrous liquid ammonia is normally shipped and stored as a liquid, either in pressure vessels at ambient temperature, e.g., at about 20° C. (about 68° F.) and about 928.7 kpascal (about 120 psig), or in refrigerated vessels at ambient or nearly ambient pressure, e.g., at about −33° C. (about −27.4° F.) and about 104.8 kpascal (about 0.5 psig). It is transported in bulk in ships, barges, and railroad tank cars, and in tank trucks on public roads and highways. It is frequently stored in large quantities at industrial sites in populated areas and is frequently used as the working fluid in large refrigeration systems. It is now coming into wider use for the removal of NOx from flue gas at power generating stations in urban areas.

Anhydrous liquid ammonia is an extremely hazardous, toxic, and volatile material. In the event of an accidental discharge, it can cause immediate death to humans and animals and rapid death to trees and plants.

Both anhydrous liquid ammonia and very concentrated aqueous liquid ammonia display a deadly characteristic which substantially increases the risk of widespread injury and death in case of a spill. Specifically, upon sudden release to the atmosphere, as might occur in a train wreck or a traffic accident, the ammonia forms a cloud made up of an aerosol fog of liquid ammonia droplets. Unlike gaseous ammonia, which, though toxic, is lighter than air and quickly dissipates to harmless concentrations, the cloud can persist for a surprisingly long time, as long as several hours, before it finally disappears. The cloud is typically heavier than air and tends to drift along the surface of the earth, i.e., the ground or the surface of a body of water. The cloud moves with the wind and can sweep over a total area, i.e., a "footprint," much larger than the area covered by the cloud at any one moment. Contact with the cloud is instantly incapacitating, and a single breath can be fatal.

Substantial numbers of bulk shipments of anhydrous liquid ammonia routinely move through or near densely populated areas. It is estimated that an anhydrous liquid ammonia spill from a truck trailer (about 18,143.7 kg (about 40,000 lb) liquid ammonia capacity) would generate a cloud having an average lethal footprint of about 1173.6 are (about 29 acres), that is, an area of about 1173.6 are (about 29 acres) in which the concentration of ammonia would reach a lethal level, about 0.5 percent, before the cloud eventually dissipated.

SUMMARY OF THE INVENTION

In application Ser. No. 07/545,855, filed Jun. 29, 1990 (hereinafter referred to as the '855 application) it was taught that both the size and the persistence, and hence the lethal footprint, of the fog cloud formed by a sudden release of ammonia can be reduced by adding a suitable coalescing or nucleating agent (e.g., urea) to liquid ammonia.

However, in many instances where ammonia is used, high purity ammonia is required. Accordingly, ammonia containing any significant nucleating agent concentration is unsuitable for numerous purposes. The present invention solves this problem by providing methods for (a) reducing the lethal footprint of the fog cloud formed by a sudden release of ammonia and (b) obtaining high purity ammonia. In an exemplary process embodying features of the present invention the nucleating agent and ammonia are combined to form a composition comprising at least about 70 weight percent ammonia, less that about 20 weight percent nucleating agent, and less than about 10 weight percent water. The resulting composition is stored and/or transported in a vessel. To obtain high purity ammonia, the ammonia is removed from the vessel by evaporating at least some of the ammonia from the composition.

The invention also provides a vessel for storing and/or transporting bulk quantities of liquid ammonia, i.e., quantities of ammonia greater than about 3,785.4 liters (about 1,000 gallons). The vessel is of the type adapted to contain or transport liquid ammonia in bulk. The vessel is characterized in that it contains a sufficient quantity of the nucleating agent to form a composition comprising at least about 70 weight percent ammonia and about 0.1 to about 20 weight percent nucleating agent when the vessel is filled to its designed liquid ammonia capacity.

DRAWING

The reduction in the risk entailed in transporting and/or storing liquid ammonia while obtaining high purity ammonia and other features, aspects, and advantages of the present invention will become better understood with reference to the following description, appended claims, and accompanying drawing where the sole FIGURE is a schematic representation of an exemplary system for removing ammonia, by evaporation, from a vessel containing a composition comprising ammonia and a nucleating agent.

DETAILED DESCRIPTION OF THE INVENTION

The present invention provides methods for (a) treating liquid ammonia to reduce the hazard associated with accidental liquid ammonia spills and (b) obtaining high purity ammonia from the treated liquid ammonia. Liquid ammonia has the propensity to form an aerosol fog upon sudden or abrupt release to the atmosphere. Thus, in accordance with this invention, liquid ammonia suitable for treatment is anhydrous liquid ammonia or an aqueous ammonia solution containing at least about 75 weight percent ammonia, preferably at least about 90 weight percent ammonia, and more preferably at least about 95 weight percent ammonia. The likelihood of forming an ammonia aerosol as a result of a spill increases with increasing ammonia concentration in the solution. At higher ammonia concentrations, the vapor pressure of the solution at a given temperature is higher, and the boiling point at a given pressure is lower.

Liquid ammonia is usually maintained in the liquid state for shipment and storage under above-ambient pressures or below-ambient temperatures or a combination thereof. Depending on the ammonia content, aqueous liquid ammonia is maintained at ambient temperature and elevated pressures such as about 273.7, 446.1, 790.8, 963.2, 1135.5, 1307.9, or even 1480.3 kpascal (about 25, 50, 100, 125, 150, 175, or even 200 psig, respectively). Aqueous liquid ammonia can also be maintained at temperatures below ambient, e.g., about 10°, 0°, −10°, −20°, −25.6°, −35.6°, or even −40° C. (about 50°, 32°, 14°, −4°, −14°, −32°, or even −40° F., respectively), but usually above the freezing point of the liquid and at above-ambient pressure if required. Anhydrous liquid ammonia is often maintained at ambient temperature at a pressure of about 928.7 kpascal (about 120 psig). Anhydrous liquid ammonia is also often maintained at about −33° C. (about −27.4° F.) at or near ambient pressure, e.g., about 104.8 kpascal (about 0.5 psig).

Exemplary vessels for storing and/or transporting liquid ammonia and aqueous liquid ammonia are summarized in the following Table I:

TABLE I

| Liquid Ammonia And Aqueous Liquid Ammonia Storage and Transportation Vessels | |
|---|---|
| Vessel | Typical Design Capacity Range |
| Tank Truck | about 15.1 to about 30.3 m³ (about 4,000 to about 8,000 gallons) |
| Railroad Tank Car | about 75.7 to about 151.4 m³ (about 20,000 to about 40,000 gallons) |
| Barge | about 1,892.7 to about 3,785.4 m³ (about 0.5 to about 1 million gallons) |
| Ship | about 3,785.4 to about 7,570.9 m³ (about 1 to about 2 million gallons) |
| Storage Tank | about 30,283.4 to about 41,639.7 m³ about 8 to about 11 million gallons |

In addition, liquid ammonia and anhydrous liquid ammonia are transported through intra- and interstate pipelines.

In a sudden or abrupt discharge to the atmosphere of liquid ammonia that has been maintained under above-ambient pressure or below-ambient temperature or both, the liquid ammonia can rapidly, even violently, boil off or flash to vapor, rapidly absorbing heat from the surroundings and forming, not merely gaseous ammonia, but a fog-like cloud of ammonia droplets. Any sudden release of anhydrous ammonia under pressure, whether the liquid itself or the vapor from the vapor space of a container, will be violent and can be expected to result in the formation of an ammonia aerosol or fog. A breach in the vapor space of a cryogenic anhydrous ammonia storage tank would be less likely to result in formation of an aerosol because of the low pressure in the vapor space and the low heat transfer into the insulated tank. However, damage to the bottom of a cryogenic tank would release cold liquid ammonia directly onto the ground where it would absorb heat and flash off as vapor; such a spill can result in the formation of a dangerous ammonia cloud.

To reduce the foot print resulting from a sudden release of liquid or anhydrous ammonia, a nucleating agent is added to liquid or anhydrous ammonia to form a composition. The nucleating agents employed in the present invention are (a) soluble in liquid ammonia and (b) capable of reducing the duration of an aerosol of ammonia when the composition is released into the atmosphere under conditions which would, in the absence of the nucleating agent, cause the liquid ammonia to form an aerosol of ammonia. While the nucleating agent can be a liquid, solid, or gas at about 101.3 kpascal (about 1 atm) and about 20° C. (about 68° F.), it is preferred that the nucleating agent be a liquid or solid, and more preferably a solid, at about 101.3 kpascal (about 1 atm) and about 20° C. (about 68° F.). Presently, the most preferred nucleating agent is urea because it is (i) readily soluble in liquid ammonia, (ii) fully compatible with many uses of liquid ammonia (e.g., agricultural usage and NOx emission control), (iii) low cost, and (iv) readily available. Other nucleating agents are readily identifiable by the information provided herein.

A small concentration of the nucleating agent is sufficient to practice the present invention. For example, as little as 0.1 weight percent can be beneficial. Usually, at least about 0.5 weight percent is used, preferably at least about 1 weight percent, more preferably at least about 2 weight percent, and most preferably at least about 4 weight percent. Usually, no more than about 20 weight percent nucleating agent is used, preferably no more than about 16 weight percent, and more preferably no more than about 12 weight percent. The nucleating agent concentration used in a given instance depends on a number of factors, such as the particular nucleating agent chosen, the composition of the liquid ammonia to be treated, and the anticipated shipment or storage conditions.

When liquid ammonia treated with a nucleating agent in accordance with this invention is abruptly discharged so as to form a cloud of ammonia fog, the nucleating agent is carried along with the discharged ammonia into the fog. The resulting cloud of ammonia fog is smaller than it would be in the absence of the nucleating agent. Furthermore, the nucleating agent speeds up the nucleation or coalescence of the fog droplets into larger droplets that are heavy enough to fall to the ground, thereby shortening the life of the cloud. On the ground, the liquid ammonia droplets absorb heat and evaporate, and the resulting gaseous ammonia quickly dissipates. Because the cloud is smaller and persists for a shorter time, it sweeps a smaller area of ground, i.e., its lethal footprint is smaller, and thus it poses a risk to fewer people.

For those applications requiring the liquid ammonia or anhydrous liquid ammonia to be substantially devoid or totally devoid of the nucleating agent, the ammonia is separated from the composition by evaporation. As used in the specification and claims, the term "substantially devoid" means that less than about 0.001 weight percent nucleating agent is present in the liquid ammonia or anhydrous liquid ammonia; and the term "totally devoid" means that less than about 0.00001 weight percent nucleating agent is present in the liquid ammonia or anhydrous liquid ammonia.

Referring now to the drawing, an exemplary system 10 for evaporating the ammonia from the composition is schematically shown in the sole FIGURE. The system 10 comprises a storage or transportation vessel 12 having present therein the ammonia- and nucleating agent-containing composition (not shown). The vessel 12 is, for example, a container in which the composition is initially stored or transported or a container to which the composition is transferred after being stored and/or transported in a different container.

Ammonia evaporates from the composition and leaves the vessel 12 through a conduit 14. The conduit 14 conducts the ammonia vapor to a compressor 16 which converts the ammonia vapor to relatively hot, liquid ammonia. The relatively hot, liquid ammonia is transported via a conduit 18 and passes through a heat exchanger 20 where it is cooled. The cooled liquid ammonia is then sent to a storage tank (not shown) or other holding vessel (not shown) via a conduit 22.

To enhance the rate at which ammonia evaporates from the composition within the vessel 12, the composition within the vessel 12 is transported by a conduit 24 to the heat exchanger 20 where the composition picks up some of the heat lost by the hot liquid ammonia stream in the conduit 18. The heated composition stream is then returned to the vessel 12 via a conduit 26.

Because the nucleating agent has a much lower vapor pressure than ammonia, virtually all of the nucleating agent remains in the vessel 12 during the evaporation process. The nucleating agent-containing vessel is thus reusable without requiring the presence of additional nucleating agent. (The nucleating agent is typically initially introduced into the vessel 12 by dissolving the nucleating agent in liquid ammonia or anhydrous liquid ammonia to form the composition and adding the composition to the vessel 12.)

The following example is intended to illustrate particular embodiments of the invention and is not to be construed in any way to limit the invention.

EXAMPLE 1

Three small discharges of liquid anhydrous ammonia were carried out. In each, about 0.45 kg (about 1 pound) of liquid ammonia was placed in a pressure vessel at ambient temperature, about 23.9° C. (about 75° F.), mounted about 4.6 meters (about 15 feet) above the ground. A remotely operated solenoid actuated a valve that released the ammonia parallel to the ground through an orifice about 0.64 cm (about 0.25 inch) in diameter. Discharge took about 10 seconds. The resulting aerosol cloud was videotaped and its size and persistence measured. Each cloud grew in size during active discharge of ammonia from the vessel, reached a maximum, and then dwindled until no part was visible.

The first discharge was of liquid ammonia without additive. The second was of liquid ammonia containing about 5 weight percent urea. The third was of liquid ammonia containing about 10 weight percent urea. The results are shown below in Table II. Persistence is the time that any part of the cloud remained visible after ammonia stopped escaping from the vessel. Footprint is the area in square feet covered or swept by the cloud before it fully dissipated.

TABLE II

| Sample | Persistence | | Footprint | | |
|---|---|---|---|---|---|
| | Sec. | % Chg. | Sq.M. | (Sq.Ft.) | % Chg. |
| Ammonia | 20 | — | 46.5 | (500) | — |
| Ammonia, 5% Urea | 14 | −30 | 11.1 | (120) | −75 |
| Ammonia, 10% Urea | 6 | −70 | 4.6 | (50) | −90 |

As documented above in Table II, the addition of merely about 5 and 10 weight percent urea resulted in dramatic reductions in the length of time the ammonia cloud persisted after active discharge was complete, and the footprints of clouds from the treated ammonia were dramatically smaller than the one from the untreated ammonia. Treatment of anhydrous ammonia with urea in accordance with this invention reduced the potentially lethal footprint of the ammonia cloud by about 75 to about 90 percent.

Many suitable compositions of anhydrous ammonia and urea can be prepared. For example, compositions having about 0.1, 0.5, 1, 2, 4, 6, 8, 10, 12, 14, 16, 18, and 20 weight percent urea, and more, as well as compositions having urea concentrations intermediate the given concentrations, e.g., about 0.5 to 1.99, 2.01 to 3.99, 4.01 to 7.99, 8.01 to 11.99, 12.01 to 15.99, and 16.01 to 19.99 weight percent urea, can be prepared and used to advantage.

While particular embodiments of the invention have been described and illustrated herein, it will be understood that the invention is not limited thereto, since many obvious modifications can be made. For example, the contents of various nucleating agent- and liquid ammonia-containing compositions are set forth in the following Table III.

TABLE III

| Liquid Ammonia, Wt. % | Nucleating Agent, Wt. % | Water, Wt. % |
|---|---|---|
| at least about 75 | less than about 20 | less than about 5 |
| at least about 76 | less than about 20 | less than about 4 |
| at least about 77 | less than about 20 | less than about 3 |
| at least about 78 | less than about 20 | less than about 2 |
| at least about 79 | less than about 20 | less than about 1 |
| at least about 79.5 | less than about 20 | less than about 0.5 |

In addition, the amount of ammonia removed from the vessel 12 by evaporating ammonia from the liquid ammonia- and nucleating agent-containing composition can range, for example, from about 10 to 100 weight percent of the ammonia present in the composition and any increment in between, e.g., about 15, 20, 25, 30, 35, 40, 45, 50, 55, 60, 65, 70, 75, 80, 85, 90, 95, 96, 97, 98, and 99 weight percent.

Accordingly, this invention is intended to include any such modifications as will fall within the scope and equivalency of the appended claims. Furthermore, the term "in bulk" as used throughout the specification and the claims with reference to a quantity of liquid ammonia means that the entire quantity is contained in a single vessel or in a system of vessels in fluid communication with one another such that a single breach or leak anywhere in the vessel or system can result in the discharge of essentially the entire quantity of ammonia contained therein. All proportions stated in weight percent are by weight of total composition.

What is claimed is:

1. A method for reducing the hazard involved in transporting or storing bulk quantities of ammonia, the method comprising the steps of:
   a. combining urea and ammonia to form a composition comprising at least about 70 weight percent ammonia, less than about 20 weight percent urea, and less than about 10 weight percent water, the composition being located within a vessel; and
   b. removing at least some of the ammonia from the vessel by evaporating ammonia from the composition.

2. The method of claim 1 wherein step (a) includes combining the urea and ammonia within a vessel to form the composition.

3. The method of claim 1 wherein step (a) includes combining the urea and ammonia outside the vessel to form the composition and placing the composition in the vessel.

4. The method of claim 1 further comprising the step (c) of transporting the vessel from a first location to a second location and step (b) includes removing at least some of the ammonia from the vessel at the second location by evaporating ammonia from the composition.

5. The method of claim 1 wherein the composition is located in a first vessel and at least some of the ammonia is removed from a second vessel by evaporating ammonia from the composition, the method further comprising the steps of:
   (c) transporting the first vessel from a first location to a second location where the second vessel is located; and
   (d) transferring at least some of the composition from the first vessel to the second vessel.

6. The method of claim 1 wherein the composition is located in a first vessel and at least some of the ammonia is removed from a second vessel by evaporating ammonia from the composition, the method further comprising the step of (c) transporting at least some of the composition from the first vessel through a conduit to the second vessel.

7. The method of claim 1 wherein the composition is located in a first vessel and at least some of the ammonia is removed from a second vessel by evaporating ammonia from the composition, the method further comprising the step of (c) transporting at least some of the composition from the first vessel through a pipeline to the second vessel.

8. The method of claim 1 wherein the composition formed in step (a) comprises at least about 75 weight percent ammonia, less than about 20 weight percent urea, and less than about 5 weight percent water.

9. The method of claim 1 wherein step (b) includes removing the ammonia from the vessel by evaporating at least about 10 weight percent of the ammonia present in the the composition.

10. The method of claim 1 wherein step (b) includes removing the ammonia from the vessel by evaporating at least about 50 weight percent of the ammonia present in the composition.

11. The method of claim 1 wherein step (b) includes removing the ammonia from the vessel by evaporating at least about 75 weight percent of the ammonia present in the composition.

12. The method of claim 1 wherein step (a) includes forming at least about 3.8 m$^3$ (about 1,000 gallons) of the composition, at least about 3.8 m$^3$ (about 1,000 gallons) of the composition being located within the vessel.

13. The method of claim 1 wherein step (a) includes forming at least about 37.9 m$^3$ (about 10,000 gallons) of the composition, at least about 37.9 m$^3$ (about 10,000 gallons) of the composition being located within the vessel.

14. The method of claim 1 wherein step (a) includes forming at least about 378.5 m$^3$ (about 100,000 gallons) of the composition, at least about 378.8 m$^3$ (about 100,000 gallons) of the composition being located within the vessel.

15. An apparatus for storing or transporting liquid ammonia comprising:
   (a) means for storing or transporting at least about 3.8 m$^3$ (about 1,000 gallons) of liquid ammonia; and
   (b) a sufficient quantity of urea located within the storing or transporting means to form a composition comprising at least about 70 weight percent ammonia and about 0.1 to about 20 weight percent urea when the storing or transporting means is filled to its design capacity with liquid ammonia.

16. An apparatus for storing or transporting liquid ammonia comprising;
   (a) means for storing or transporting at least about 3.8 m$^3$ (about 1,000 gallons) of liquid ammonia; and
   (b) a substance present in the storing or transporting means, the substance being formed by evaporating from a composition at least about 10 weight percent of the ammonia present in the composition at the beginning of the evaporation process,
wherein, prior to the beginning of the evaporation process, the composition comprises at least about 70 weight percent ammonia and about 0.1 to about 20 weight percent urea.

17. The apparatus of claim 16 wherein the substance is formed by evaporating from the composition at least about 50 weight percent of the ammonia present in the composition at the beginning of the evaporation process.

18. The apparatus of claim 16 wherein the substance is formed by evaporating from the composition at least about 75 weight percent of the ammonia present in the composition at the beginning of the evaporation process.

19. The apparatus of claim 16 wherein the substance is formed by evaporating from the composition at least about 90 weight percent of the ammonia present in the composition at the beginning of the evaporation process.

20. The apparatus of claim 16 wherein the substance is formed by evaporating from the composition at least about 95 weight percent of the ammonia present in the composition at the beginning of the evaporation process.

* * * * *